T861023

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 8, 1969

861 O.G. 369

764,970

SYNTHESIS OF ETHER-SUBSTITUTED AROMATIC NITRILES

Charles W. Hargis, Johnson City, Tenn.
(P.O. Box 511, Kingsport, Tenn. 37662)

Filed Oct. 3, 1968. Published Apr. 8, 1969
Class 260—465
No Drawing. 6 Pages Specification

A process whereby ether-substituted aromatic nitriles may be prepared in high conversion and yield comprising contacting a mixture of an aromatic carboxylic acid ester containing an ether group and at least a stoichiometric amount of ammonia with a boron phosphate catalyst at a suitable temperature and for a suitable period of time.